United States Patent [19]
Zabel et al.

[11] Patent Number: 5,487,910
[45] Date of Patent: *Jan. 30, 1996

[54] PROCESS FOR PREPARING A MEAT EMULSION CONTAINING MEAT BROTH AND PRODUCT THEREOF

[75] Inventors: Dale D. Zabel, Basking Ridge; Charles B. Brown, Rutherford, both of N.J.; James V. Cassetta, Pearl River, N.Y.

[73] Assignee: Thomas J. Lipton, Co., Division of Conopco, Inc., Englewood Cliffs, N.J.

[ * ] Notice: The term of this patent shall not extend beyond the expiration date of Pat. No. 5,409,730.

[21] Appl. No.: 346,103

[22] Filed: Nov. 29, 1994

[51] Int. Cl.$^6$ .................................................. A23L 1/317
[52] U.S. Cl. ........................................ 426/574; 426/646
[58] Field of Search ................................. 426/104, 105, 426/574, 646, 802, 804

[56] References Cited

U.S. PATENT DOCUMENTS

| | | | |
|---|---|---|---|
| 3,023,104 | 2/1962 | Battista | 426/804 X |
| 4,089,981 | 5/1978 | Richardson | 426/104 |
| 4,132,810 | 1/1979 | Knutson | 426/104 |
| 4,143,164 | 3/1979 | Shanbhag et al. | 426/104 |
| 4,376,134 | 3/1983 | Kumar | 426/104 X |
| 4,504,515 | 3/1985 | Hohenester et al. | 426/641 |
| 4,844,922 | 7/1989 | Uemura | 426/104 |
| 4,904,496 | 2/1990 | Izzo et al. | 426/105 X |
| 4,943,445 | 7/1990 | Norton et al. | 426/804 X |
| 5,151,290 | 9/1992 | Norton et al. | 426/804 X |
| 5,213,829 | 5/1993 | Cox et al. | 426/104 |
| 5,294,456 | 3/1994 | Jenkins et al. | 426/574 X |

*Primary Examiner*—Arthur L. Corbin
*Attorney, Agent, or Firm*—James J. Farrell

[57] ABSTRACT

A method for preparing a product containing a continuous phase of heat set lean meat emulsion having dispersed therein a water-in-oil emulsion of a water-in-oil emulsion. The discontinuous phase has a continuous phase of fat and a discontinuous aqueous phase containing a gellable meat broth. A product prepared by the method is also disclosed.

13 Claims, No Drawings

PROCESS FOR PREPARING A MEAT EMULSION CONTAINING MEAT BROTH AND PRODUCT THEREOF

BACKGROUND OF THE INVENTION

The present invention relates to meat products, including ground meat, having enhanced flavor delivery while still retaining highly desirable appearance, taste and cooking performance characteristics, and to a method of making these products.

The prior art has adopted a number of approaches to improve the acceptability of selected meat products, for example, attempts have been made to reduce the fat and cholesterol content of prepared meat products. One such approach is found in U.S. Pat. No. 3,023,104 where the desired results are obtained by simply extending conventional products through the addition of crystallite aggregates of cellulose. The cellulose is inert and so the resulting product has less of each ingredient than the natural product. U.S. Pat. No. 4,504,515, in another approach, prepares low-fat meat products by combining high levels of skimmed milk or whole milk with comminuted lean meat. A low cholesterol sausage analog of the ground meat type using egg white as the heat denaturable binder system is described in U.S. Pat. No. 4,376,134. A bacon analogue is similarly described in U.S. Pat. No. 4,143,164. U.S. Pat. No. 4,132,810 also deals with simulated bacon. U.S. Pat. Nos. 4,089,981 and 4,844,922 deal with simulated products containing gelling agents.

Other attempts have been made to prepare low fat products utilizing technology which forces meat protein to bind increased quantities of water or which entail the use of cereal protein and/or carbohydrates and other carbohydrate hydrocolloids to act as agents which bind larger quantities of water in the product. The resulting products generally have an unacceptable texture and taste, being either overly wet or mealy in nature.

U.S. Pat. Nos. 5,151,290 and 4,943,445 deal with edible dispersions, used as spreads, containing various gelling agents.

The reduction of fat and cholesterol, without a substantial sacrifice in the texture and flavor quality is described in commonly owned U.S. Pat. No. 4,904,496 incorporated by reference herein. In this patent, gelatin is employed with a specific emulsion system.

SUMMARY OF THE INVENTION

It has been found that a flavor enhanced meat product of excellent eating qualities is provided by preparing a heat set product having a continuous phase of lean meat protein containing a discontinuous phase which in turn comprises particles of a water-in-oil type emulsion. The continuous phase of the water-in-oil type emulsion is an edible fat, and the discontinuous phase is a meat broth prepared by aqueous extraction from meat having a high percentage of connective tissue. By using a meat broth as the discontinuous phase it is not necessary to employ gelatin as used in U.S. Pat. No. 4,904,496. In appropriate circumstances, the water-in-oil emulsion can be employed as a stand alone product which can be stored and used at a later time to prepare final meat products.

The meat broth in the water-in-oil emulsion is an aqueous solution or dispersion prepared by an aqueous extraction from meat which has a high percentage of connective tissue. The broth may optionally contain, dissolved or dispersed in it, selected flavoring agents or salts such as, for example, sodium or potassium chloride, or selected phosphates. The products of the present invention may also be low fat, low cholesterol meat products. Thus, the products overall may have fat contents in the range of 5% to 40%.

The major portion of the fat is dispersed throughout the lean meat as droplets of a water-in-oil emulsion. The discontinuous phase of this water-in-oil emulsion is an immobilized aqueous meat broth prepared by aqueous extraction as described above. The meat broth may contain, if desired, salts and/or flavorants present at a level of about 0.1% to 10%, preferably 0.1% to 8%.

The immobilized aqueous meat broth may serve as an encapsulating agent for the dissolved or dispersed salt or flavoring agent which can then be delivered directly to the taste receptors on the tongue during mastication. At the same time, because the meat broth portion of the discontinuous phase is most evident to the tongue during eating, the products of this invention also achieve enhancement of the normal meat flavors released during the mastication process even without added salt or flavor enhancers.

During the manufacture of these meat products the grinding/mixing process may, if desired, release soluble myosin into the continuous protein phase which in turn encapsulates the discontinuous water-in-oil phase producing stable fat containing droplets throughout the continuous phase. The formation of this duplex type of emulsion can prevent weepage of either fat or the internally gelled or immobilized aqueous phase from the product. The formation of such a stable duplex emulsion also ensures that the product upon cook-up remains juicy, moist and succulent and has a cooked texture resembling a product containing higher fat. The product also has less shrinkage upon cook-up than is normally exhibited by lower fat products.

The highly desirable products of the present invention may be provided by a method which includes the steps of:

(a) forming a water-in-oil emulsion by forming an aqueous gelled or immobilized meat broth prepared by extracting meat with a high percentage of connective tissue in an aqueous medium. Salt or another flavoring ingredient may be added if desired at a concentration up to about 10%. If salt or other flavoring ingredient is used it will be used in an amount sufficient to produce a desirable organoleptic effect and thus enhance the flavor of the product. In practice this amount is usually about 0.1% to about 10%. The meat broth is then combined with an edible fat to form the water-in-oil emulsion, (b) forming a ground lean meat phase of high protein content and good binding capacity, (c) dispersing droplets of the water-in-oil emulsion formed in step (a) substantially evenly throughout the lean meat phase of step (b);

(d) grinding the mixture to optionally release myosin from the lean meat phase to set up a duplex emulsion, alternatively if the myosin is not released a satisfactory mixture may also result; and (e) heat setting the combined emulsion.

In accordance with this invention, it is preferred that the fat content of the product be in the range of 5% to 40% by weight, and that a major portion of the fat be supplied by the water-in-oil emulsion formed in step (a). It is further preferred that the lean meat of step (b) and the water-in-oil emulsion of step (a) be combined in the relative proportion, by weight, of 9 to 1, however, a broader range of proportions, e.g., about 1.5 to 1, to about 9 to 1 may be used. The meat product may be induced to set by heating, either by the producer or the consumer, but the product of this invention preferably is heat set.

DETAILED DESCRIPTION OF THE INVENTION

The products with which the present invention is concerned are meat products which may contain a substantial level of fat in order to obtain desired eating characteristics. Examples of such products include ground meat products such as ground chopped meats for use in hamburgers, meat loaf and meat patties; sausage and sausage patties, breakfast sausage; Italian sausage; luncheon meats such as salami; and emulsion based sausages. This invention will be further described in terms of ground meat products, such as hamburgers, meat patties, breakfast sausage, sausage, and sausage patties, but it is understood to apply to all products of the type described above.

In an embodiment of this invention, the first step in the process involves the preparation of a water-in-oil emulsion which utilizes a fat as a continuous phase, and a gelled or immobilized aqueous meat broth prepared by an aqueous extraction of meat with a high percentage of connective tissue. Optionally, salt or other flavoring agent may be used. This immobilized meat broth is a discontinuous aqueous phase in the emulsion. It is theorized that the collagen in the broth stabilizes the emulsion while entraining, if present, the salt or other flavoring ingredient, either dissolved or as a dispersed particle, and where the products are eaten cold, will have the same taste and textural impression as given by fat. The collagen which may be present in the invention and food grade fats melt on the tongue at roughly comparable temperatures thus allowing the entrained salt or other flavoring agent to be delivered directly to the taste receptors as a burst at the melt temperature of the gelled meat broth.

It is preferred that sufficient collagen be present to ensure that the emulsion droplets contain the gelled meat broth at room temperature below 70° F. to 75 ° F. Thus, the collagen present in the meat broth should be in an amount higher than the minimum necessary to form a gelled meat broth at the solidification temperature of the fat phase. On the other hand, too high a level of collagen will result in a tough, rubbery product which will not fully melt on the tongue at room temperature. The precise amount of collagen is not critical, and in the usual case, amounts ranging from 0.5% to 9% by weight of the meat broth will be satisfactory. The optimum amount of collagen is in the range of 2% to 5% by weight of the meat broth in the water-in-oil emulsion with a level of 3% on the same basis being preferred.

The meat broth is prepared by extracting selected meat with a high percentage of connective tissue in water at substantially neutral pH and at elevated temperatures. Normally, the meat is comminulect and added to water at ambient temperature. The temperature is then raised to 150° F. to 190° F. for about ½ to 4 hours, preferably ½ to 1 hour.

The meat selected is either beef or pork preferably containing 5% to 60% by weight of connective tissue. This meat is obtained from a selection process where better grades of meat are separated out and the gristle containing meat is designated as scrap. This scrap meat is used to prepare the meat broth. Pork is extracted at lower temperatures of 150° F. to 160° F.; beef at higher temperatures of about 190° F. Although not necessary, it is preferred, for reasons of microbiological stability and in some cases, the enhancement of flavor impact, for the meat broth to contain salt and if desired, other flavoring agents such as monosodium glutamate (MSG), ribotide spices, spice extracts, HVP, sugar and specific flavorants such as Bar-B-Q, grill and the like. Accordingly, if desired, sodium chloride may be added to the meat broth at this stage at a level of 0.1% to 8% by weight, preferably a level of 2% by weight of the aqueous meat broth. The mixture, is then heated and stirred until all the meat broth material and salt, if used, has been dissolved and the optional flavoring agent, if any, dispersed. The broth can then, if desired and not already accomplished, be pasteurized. Volatile flavoring agents such as beef flavor will usually be added after pasteurization unless a closed system to retain volatiles is employed.

The temperature of the broth is reduced under agitation to 75° F. to 95° F., preferably 80° F. Agitation prevents the broth from gelling and makes it available for the production of the water-in-oil emulsion.

The fat component of the water-in-oil emulsion phase may be any edible fat compatible with the processed meat being produced including vegetable fat or oil, or hydrogenated fish oil, if desired. The principal source of the fat is usually trimmings off the carcass and these trimmings can have a fat content ranging from 50% to 100%. The amount of non-fat material present is limited to that amount which will still allow the oil-in-water emulsion to form. This, of course, depends on the type of fat and non-fat material. As a practical source, trimmings of 50% lean/50% fat to 15% lean/85% fat from either beef or pork are used as they are standard articles of commerce.

The meat trimmings used as a source of fat are initially ground, for example, through a ¼ to ½ inch grinding plate, at 38° F. to 45° F. The ground trimmings are then comminuted in a high speed blender, such as a Stephen Vertical-Cutter/Mixer model VTC400 operated at either 1800 or 3600 rpm. Intermediate ranges are of course permissible. Fat-rich beef trimmings are typically comminuted at 3600 rpm at a temperature of 66° F. to 70° F. until a creamy, plastic, fat continuous phase has been established. Fat-rich pork trimmings, on the other hand, are typically comminuted at 1800 rpm at a temperature of 55° F. to 57° F. To ensure that a continuous fat phase has been achieved, conductivity of the phase is tested, with a conductivity of 0 to 15 mhos being indicative of a continuous fat phase.

The water-in-oil emulsion is next prepared by combining the meat broth with the comminuted fat-rich meat trimmings. The broth may be added to a Stephen Vertical-Cutter/Mixer at a steady rate, while the mixture is being comminuted at 1800 rpm. The temperature of the broth when added is preferably at 80° F. to 90° F. After all the broth has been added, comminution continues until the temperature reaches 80° F. to 90° F. for beef and 75° F. to 85° F. for pork.

The formation of a stable water-in-oil emulsion is confirmed by conductivity measurement and microscopic examination. The emulsion is discharged from the Stephen Vertical-Cutter/Mixer and its temperature lowered to allow the fat to solidify and the aqueous meat broth phase to reach a gelled or immobilized state. Generally, the temperature is lowered to 20° F. to 30° F. Preferably the material is frozen. This may be accomplished by any convenient method. It is particularly important to insure that the tempering and how it is done does not break the emulsion.

Other suitable edible fats which may be used in the practice of this invention include various animal and vegetable fats and hydrogenated fish oil. The water-in-oil emulsion can be made using solid vegetable shortening or combinations of vegetable shortenings and chicken fat.

In the final emulsion state, a finely dispersed aqueous meat broth comprising 0.5% to 9% collagen, up to 8% salt or other flavorant, and some of the soluble protein from the lean phase of the fat-rich trimmings is uniformly surrounded by a fat coating. The final composition varies based on the proportions of starting ingredients and the fat content. A high fat content will result in a low moisture content while a low fat content will result in a higher moisture content. The aggregation of these finely dispersed emulsion droplets produces a continuous fat phase. The solidification of the fat phase and the gelling of the meat broth produces a stable emulsion, which to the tongue is perceived as only fat. The latent heat of the tongue is sufficient to melt the fat coating and the gelled meat broth while maintaining the perception of only fat. The melting of this emulsion directly releases the salt or flavoring solution or dispersion to the taste receptors thus enhancing taste perception.

In accordance with the second stage of preparing products of this invention, a lean meat of high protein content and good binding capacity is prepared using any of several prior art procedures. Chunks of meat such as bull meat, boneless primal cuts of cattle, hogs, veal, sheep, as well as chicken or turkey, or other cuts or mixtures thereof, may be employed. In accordance with one preferred embodiment, beef or pork trimmings having 78–92% lean meat, with the balance fat, are coarse ground at 36° F. to 42° F. through a ½ to 1 inch plate in a Wolfking grinder. Solid carbon dioxide is preferably employed to ensure that the meat stays in the temperature range cited.

In a like manner, the frozen water-in-oil emulsion is similarly coarse ground under the conditions cited above. Generally at 10° F. to 30° F., and preferably at 20° F. to 30° F., the coarsely ground water-in-oil emulsion and the coarsely ground high protein content meat are combined in proportions sufficient to provide a final ground meat produot where the water-in-oil emulsion represents from 3% to 30% of the formula content of the finished product. The resulting blend is then preferably ground to its final particle size through a ⅛ to ¼ inch plate. The ground meat mixture is then heat set and made into patties or shaped into final sausage products. While sufficient shear may be imposed on the mixture during mixing to provide myosin this is, by no means, critical to the final product as satisfactory products also result without producing substantial quantities of myosin.

The patties or sausages made by this process can be either frozen directly or precooked for delivery to the end user. It is noted that the process of this invention, upon cooking of the patty or sausage provides for more juiciness and less product shrinkage with an enhanced meat taste.

All parts and proportions herein are by weight unless otherwise indicated.

The invention will be further described in the following examples.

EXAMPLE 1

Procedure for Extracting Meat Broth

The objective is to determine the optimum cooking time and temperature needed to extract beef connective tissue to produce a high gel strength. 75 grams of ground partially defatted beef tissue was weighed out into a 250 gram beaker. At a 1:1½ solid to water dilution ratio, 112.5 grams of water was added to the beaker and the solids within. Using two stainless steel pots, a double boiler was set up. Both pots were filled with 1½ cups of warm water. When the temperature had reached 190° F., the 1:1½ dilution ratio mash, in its beaker, was placed in the inner vessel and covered to avoid excessive water loss due to evaporation.

After four hours of cooking, during which water was added to both vessels to maintain their levels, the mash was removed from the beaker and was strained through double layered cheese cloth allowing the broth to pass through into another beaker. This allowed the broth filtrate to pass while holding back large proteinacious particles. The particles were wrapped in the cheese cloth and squeezed so that all the broth could be obtained from the protein mash.

The broth was then placed in a separatory funnel and allowed to separate for one hour. Heat was applied externally onto the lower area of the funnel to inhibit the solidification of the fat, which rose to the top of the funnel.

The separated broth was then filtered and the liquor was brought to room temperature. At this time, duplicate refractometer readings were taken and recorded. The broth was then placed into a cold water bath to age it for 16 to 18 hours at a temperature of 10° C. After the allotted time, the gel strength was determined by using a Voland-Stevens Texture Analyzer. This process was repeated using 1, 2, 3, 4, 5 hour parameters in duplicate all at 190° F., and with a separation time of one hour.

TABLE 1

Beef Tissue Data

| Dilution | Time | Temperature (°F.) | % BX = TC | Average Gel Strength (In Grams) |
|---|---|---|---|---|
| 1:1-½ | 1 hour | 190 | 4.1 | 39 |
| 1:1-½ | 2 hours | 190 | 4.5 | 57 |
| 1:1-½ | 3 hours | 190 | 5.0 | 68 |
| 1:1-½ | 4 hours | 190 | 6.7 | 149 |
| 1:1-½ | 5 hours | 190 | 5.3 | 74.2 |

EXAMPLE 2

Pork Tissue Reduction/Extraction

The frozen pork tissue was tempered in the refrigerator over a 4 day period. The blocks of semi-frozen tissue were cut into squares of 5-6" pieces, bagged and again refrigerated over night. Approximately 124 lbs. of tissue were prepared for extraction. A sample of the tissue was cooked to evaluate the strength of the pork broth using two dilution ratios, (1:1 & 1:1½). The appropriate dilution ratio for this material was determined to be a 1:1 ratio of tissue to water.

Thermal Processing Steps

The pork tissue was divided into two equal parts, one portion of 62# was reduced in a bowl chopper to a fine particle size, and then added to a swept surface jacketed Lee kettle. Initially, the temperature was set at 150°–160° F. for the first ½ hour. However, due to problems of removing the pork tissue from the liquid, the temperature fluctuated between 150°–190° F. during the three hour run.

Separation Process

The mash was drained from the kettle into a sieve and the broth was pressed out. This method increased fines in the broth which resulted in some plug-ups in the Westfalia centrifuge (model #KA206). The centrifuge was fed from an insulated tank in which the temperature of the broth was maintained at 105°–115° F. This process yielded a total of 94 lbs. of pork broth.

EXAMPLE 3

Procedure for Making Water-in-Oil Emulsions

A. Preparation of beef water-in-oil emulsions

An aqueous meat broth is prepared in in Example 1. Salt (sodium chloride) at a level of 2% by weight of the aqueous broth is added. The components are fully dissolved by agitation, and the solution is then brought to 150° F. for a period of 15 minutes and then cooled down.

Beef trimmings containing 70% fat and 30% lean meat are ground by passage through a ¼ inch grinding plate using a Wolfking mixer/grinder equipped with a sinew and bone eliminator. The ground trimmings are then placed in a Stephen Vertical-Cutter/Mixer, Model VTC400, made by the Stephen Food Technology Corp. of Germany. The Stephen Cutter is operated at 3600 rpm for 4 to 7 minutes, raising the temperature of the ground trimmings prepared above to 60° F.–70° F. The comminuted fat rich meat has a creamy, plastic appearance, and when conductivity is measured, it will be less than 15 mho.

The aqueous meat broth, prepared above is cooled to a temperature of 80° F.–90° F. and then added at a constant rate to the Stephen Cutter and combined with the comminuted trimmings in the proportions by weight of 60% aqueous gelatin solution and 40% of the comminuted trimmings. The cutter/mixer is operated at 1800 rpm during this addition for a period of 4 to 6 minutes. This time will depend upon the amount of broth to be added. After the addition of all the broth, the cutter/mixer is allowed to run at 1800 rpm until the temperature of the product reaches 84° F.–88° F. A smooth, creamy white product is obtained. This product, under microscopic examination and conductivity measurements reading 0.00–15.0 mho, is confirmed to be a water-in-oil emulsion.

The product is discharged from the mixer/cutter and packaged. The product may be placed into casing employing a VEMAG meat stuffer, and then frozen by passing the stuffed casing through a glycol bath. If the product were to be boxed it would be frozen by placing the material in a blast freezer.

The water-in-oil emulsion has the following typical analysis:

| Protein | 5.17% |
| Moisture | 64.94% |
| Fat | 28.60% |
| Salt | 1.29% |

B. Preparation of pork water-in-oil emulsions

An aqueous meat broth is prepared as in Example 2. Salt (sodium chloride) at a level of 2% by weight of the aqueous broth is added. The components are fully dissolved by agitation, and the solution is then brought to 150° F. for a period of 15 minutes and cooled down.

Pork trimmings containing 50%–80% fat (the optimum fat concentration for the pork is 60–72%) and lean meat are ground by passage through a ¼ inch grinding plate using a Wolfking mixer/grinder equipped with a sinew and bone eliminator. The ground trimmings are then placed in a Stephen Vertical-Cutter/Mixer, Model VTC400. The Stephen Cutter is operated at 1800 rpm for 3 to 5 minutes, raising the temperature of the ground trimmings prepared above to between 55° F.–60° F. The comminuted fat rich meat has a creamy, plastic appearance, and when conductivity is measured, the conductivity will be less than 15 mho.

The aqueous meat broth prepared above, is cooled to a temperature of 80° F.–90° F. and then added at a constant rate to the Stephen Cutter and combined with the comminuted trimmings in the proportion by weight of 60% broth and 40% of the comminuted trimmings. The cutter/mixer is operated at 1800 rpm during this addition for a period of 4 to 6 minutes. This time will depend upon the amount of broth to be added. After the addition of all the broth, the cutter/mixer is allowed to run at 1800 rpm until the temperature of the product reaches 77° F.–81° F. A smooth, creamy white product is obtained which, under microscopic examination and conductivity measurements reading 0.00–15.0 mho, is confirmed to be a water-in-oil emulsion.

The product is discharged from the mixer/cutter and packaged off either into boxes or casing for further use. Product placed into casing employs a VEMAG meat stuffer, and is then frozen by passing the casing through a glycol bath. Boxed product is frozen by placing the material in a blast freezer.

The water-in-oil emulsion has the following typical analysis:

| Protein | 6.03% |
| Moisture | 65.45% |
| Fat | 28.24% |
| Salt | 1.30% |

EXAMPLE 4

Preparation and Evaluation of Ground Beef Patties

The beef water-in-oil emulsion prepared in Example 3 is used to prepare ground beef patties. The emulsion is frozen and ground through a ½ inch plate. Combinations of beef trimmings are used to prepare a final patty. The designation of the beef trimmings varies depending on the amount of lean beef, for example, 93% lean beef and 75% lean beef are used in the Sample A control. The lean beef trimmings are ground through a ½ inch plate at a temperature of 38° F. The typical weight percentage of the designated lean beef in each patty and the weight percentage of the beef, water-in-oil emulsions are listed below for the various comparisons made:

| CONTROL | | INVENTIVE PATTY WITH BEEF WATER-IN-OIL EMULSION | |
| --- | --- | --- | --- |
| DESIGNATION | WT. % | DESIGNATION | WT. % |
| SAMPLE A. 10% FAT CONTENT BEEF PATTIES | | | |
| 93% Lean Beef | 83.1% | 93% Lean Beef | 85.7% |
| 75% Lean Beef | 16.9% | Emulsion (fat content ≈ 28%) | 14.3 |
| SAMPLE B. 22% FAT CONTENT BEEF PATTIES | | | |
| 91% Lean Beef | 20% | 91% Lean Beef | 55% |
| 75% Lean Beef | 80% | 75% Lean Beef | 25% |
| | | Emulsion (fat content ≈ 28%) | 20% |

The mixtures of meats are blended in a ribbon mixer, and then ground through a 5/32 inch plate at a final temperature of 30° F.–32° F. The ground meats are formed into 3.8 ounce patties on a Hollymatic.

The formed patties are weighed to provide side by side cooking comparisons. The patties are cooked for 2 minutes on each side on a flat grill preheated to 350° F., which ensures an internal cook temperature of 160° F. The cooked patties are evaluated for shrink (weight loss during cooking), juiciness, texture and flavor.

Upon evaluation the products made with the water-in-oil emulsion are expected to be of comparable texture to the control, with greater juiciness and more meat flavor. For the 10% fat content patties, the control exhibits a cook yield of 86.3% while the water-in-oil emulsion containing patties are expected to show a higher cook yield. Likewise, the cook yields for the 22% fat products are 79.7% for the control and are expected to be higher for the water-in-oil emulsion containing patties.

EXAMPLE 5

Preparation and Evaluation of Ground Pork Patties

The pork water-in-oil emulsion prepared in Example 1 is used to prepare ground pork patties. The emulsion is ground frozen through a ½ inch plate. As in Example 2, combinations of lean pork trimmings are used to prepare the final patty. The designation of the pork trimmings varies depending on the amount of lean pork. The lean pork trimmings are ground through a ½ inch plate at a temperature of 32° F.–38° F. The typical weight percentage of the designated lean pork in each patty and the typical weight percentage of the pork water-in-oil emulsions are listed below for the various comparisons:

| CONTROL | | INVENTIVE PATTY WITH PORK WATER-IN-OIL EMULSION | |
|---|---|---|---|
| DESIGNATION | WT. % | DESIGNATION | WT. % |
| SAMPLE C. 10% FAT CONTENT PORK PATTIES | | | |
| 94% Lean Pork | 90% | 94% Lean Pork | 80% |
| 64% Lean Pork | 10% | Emulsion (fat content ≈ 28%) | 20% |
| SAMPLE D. 15% FAT CONTENT PORK PATTIES | | | |
| 94% Lean Pork | 70% | 94% Lean Pork | 65% |
| 64% Lean Pork | 30% | 63% Lean Pork | 15% |
| | | Emulsion (fat content ≈ 28%) | 20% |
| SAMPLE E. 37% FAT CONTENT PORK PATTIES | | | |
| 63% Lean Pork | 100% | 63% Lean Pork | 90% |
| | | Emulsion (fat content ≈ 28%) | 10% |

The mixtures of meats are blended in a ribbon mixer, and then ground through a ¼ inch plate at a final temperature of 28° F.–30° F. The ground meats are formed into 3.8 ounce patties on a Hollymatic, and the composition of the patties is confirmed by analysis.

The formed patties are weighed out for side by side cooking comparisons. The patties are cooked for 3 minutes on each side on a flat grill preheated to 350° F., which ensures an internal cook temperature of 160° F. The cooked patties are evaluated for shrink (weight loss during cooking), juiciness, texture and flavor.

Upon evaluation the products made with the inventive water-in-oil emulsion are expected to have a comparable texture to the control, and to have greater juiciness and more meat flavor.

EXAMPLE 6

Salami and pepperoni products are prepared by the following procedure:

The beef water-in-oil emulsion prepared as set forth in Example 3 is cut into slabs or disks while still in the frozen state.

In a separate procedure, beef trimmings having 70%–90% lean meat are added to a Laska Bowl Chopper, where they are chopped with sodium chloride, 0.5%–1.0%, sodium nitrite as Prague Powder at 0.25% and sodium erythorbate at 0.0361%, all by weight of the finished product. The mixture is chopped for 1–3 minutes at 35° F.–45° F. The frozen water-in-oil emulsion prepared above is added to the chopped mixture at the meat emulsion temperature, seasoning for the particular variety in question is added, and chopping is continued for an additional 1–2 minutes to produce a coarse chopped product. The amount of the water-in-oil emulsion added depends upon the requirement of a full fat or reduced fat product. The coarse chopped, comminuted mixture, salami or pepperoni depending upon the seasoning used, is then run into the hopper of a continuous stuffing machine. The mixture is stuffed into 78 mm synthetic casing and the large links run through a commercial smoke house according to the following approximate schedule: 130° F. for 20 minutes; 150° F. for 1 hour, 30 minutes; and 180° F. until an internal temperature of 155° F.–160° F. is attained. The temperature of the smokehouse is then lowered to slowly dry out the product. The product is transferred to a drying room for a period of time sufficient to reduce the moisture content of the product and reduce the moisture activity below 0.84.

Upon evaluation, the salami and pepperoni produced by this procedure are expected to be of high quality, succulent and have excellent taste, texture and appearance.

EXAMPLE 7

Manufacture of 10% Frankfurters

The formulas A and B below were used to formulate two frankfurters generally according to Example 6. All standard procedures were followed to manufacture the frankfurters. Standard thermal processing procedures where followed. An average smoke house shrinkage of 16.4% was achieved. The CEM analysis was done for fats/moisture on the control and antioxidant franks. Results were 9.29% and 9.31% for fats, and moistures were 70.25% and 70.96% respectively.

| | Formula A | | |
|---|---|---|---|
| Meat Block | % Lean | Total Wt. in # | Total % of Frankfurter Emulsion |
| Lean Beef LET** | 95 | 30.45 | 46.99 |
| **Beef Trimmings | | 4.55 | 7.02 |
| **Salt | | 0.14 | 0.20 |
| **Cure | | 0.01 | 0.01 |
| Broth | | 6.73 | 10.38 |
| Total LET | | 11.37* | 17.52*** |

-continued

*Including 4.55 # in Beef Trimmings
***Including 7.02% for Beef Trimmings

| Meat Block | Total Wt. in # | Total % of Frankfurter Emulsion |
|---|---|---|
| Salt | 0.67 | 1.03 |
| KCl | 0.35 | 0.54 |
| Tripolyphosphate (33.0% Na) | 0.11 | 0.16 |
| Seasoning:July | 0.68 | 1.03 |
| Charoil | 0.03 | 0.04 |
| Water | 19.60 | 30.25 |
| Corn Syrup Solids | 0.87 | 1.34 |
| Dextrose | 0.56 | 0.86 |
| Sodium Erythorbate | 0.02 | 0.03 |
| Cure | 0.08 | 0.12 |
| Total Ingredients | 64.79# | 100% |

Formula B

| Meat Block | % Lean | Total Wt. in # | Total % of Frankfurter Emulsiont |
|---|---|---|---|
| Lean Beef LET | 95 | 21.75 | 46.98 |
| **Beef Trimmings | | 3.25 | 7.02 |
| **Salt | | 0.10 | 0.21 |
| **Cure | | 0.01 | 0.02 |
| **Broth | | 4.80 | 10.37 |
| Total LET | | 8.13* | 17.55*** |

*Including 3.25# of Beef Trimmings
***Including 7.02% for Beef Trimmings

| | | |
|---|---|---|
| Salt | 0.48 | 1.03 |
| Lite Salt (50/50 NaCl/KCl) | 0.25 | 0.54 |
| Tripolyphosphate (33.0% Na) | 0.08 | 0.17 |
| Seasoning:July | 0.49 | 1.05 |
| Charoil | 0.02 | 0.04 |
| Water | 14.00 | 30.24 |
| Corn Syrup Solids | 0.62 | 1.33 |
| Dextrose | 0.40 | 0.86 |
| Sodium Erythorbate | 0.01 | 0.02 |
| Cure | 0.06 | 0.12 |
| Total Ingredients | 46.29 | 100 |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A method of preventing excessive cooking yield loss and enhancing the flavor of a ground or chopped meat product by lowering the concentration of auxiliary ingredients necessary to obtain a perceived flavor change in said products after cooking comprising:

(a) comminuting lean meat to prepare a lean meat mixture and controlling said comminuting to form a continuous heat-settable lean meat phase;

(b) adjusting the temperature of said lean meat phase to 30° F. to 40° F.;

(c) preparing a water-in-oil emulsion having a continuous phase containing edible fat and a discontinuous aqueous phase containing a gellable meat broth;

(d) hardening said water-in-oil emulsion by reducing the temperature thereof to 20° F. to 30° F.;

(e) mixing the lean meat phase of (b) and the hardened emulsion of (d) at a temperature of 10° F. to 30° F. to produce said ground or chopped meat product; and then (f) heating said product at a temperature sufficiently high and for a sufficient length of time to achieve an internal temperature of 155° F.–165° F., thereby heat setting said product.

2. The method of claim 1, wherein the lean meat mixture is comminuted to form a coarse ground mixture, the emulsion of step (c) is comminuted to form coarsely ground particles, and both coarsely ground materials are mixed and heated to form a heat set mixture.

3. The method of claim 1, wherein the ground or chopped meat product is a heat set meat batter at least substantially bound by compression.

4. The method as defined in claim 1 wherein the hardened water-in-oil emulsion is prepared by:

(i) forming an aqueous dispersion of:
      (a) meat extract to prepare a meat broth;
      (b) optional flavorants and flavor enhancers selected from the group consisting of sodium chloride, potassium chloride, sodium phosphate, potassium phosphate, monosodium glutamate, ribotide, spices, spice extracts, hydrolyzed vegetable protein (HVP), sugar, specific flavorants and mixtures thereof; and
      (c) optional emulsifiers;

(ii) optionally pasteurizing the broth;

(iii) controlling the temperature of the broth to 75° F.–85° F. with mixing and holding for future use;

(iv) preparing at a temperature of about 38° F. to 45° F. an edible fat component, containing 50% to 100% fat by:
      (a) grinding and reducing the temperature of meat trimmings to reduce the particle size thereof;
      (b) further reducing the particle size of said meat trimmings by high shear cutting combined with temperature control to form a creamy, continuous plastic fat phase having a conductivity of 0.00 to 15.0 mho, wherein the temperature of said meat trimmings is dependent on the type of meat, the temperature for pork being controlled at 55° F. to 65° F. and the temperature for beef being controlled at 50° F. to 70° F.;

(v) combining the meat broth with the continuous plastic fat phase by shearing the fat phase and slowly adding the meat broth while keeping the temperature thereof below about 95° F. to form a water-in-oil emulsion; and then (vi) lowering the temperature of said emulsion to 20° F.–30° F. to solidify the fat and gel the meat broth.

5. The method as defined in claim 4, wherein the meat broth has a gel strength of 10–60.

6. The method of claim 4, wherein the hardened water-in-oil emulsion has a salt concentration of up to 8%.

7. A product prepared by the process of claim 4.

8. The method of claim 1, wherein the lean meat is chopped or ground meat.

9. The method of claim 1, wherein the water-in-oil emulsion is finely dispersed in the continuous lean meat phase by chopping or grinding.

10. A product prepared by the method of claim 1 comprising a continuous phase of heat set lean meat and a discontinuous phase, wherein the discontinuous phase includes the major fat content of the product as particles of water-in-oil emulsion and immobilized salt.

11. A product as defined in claim 10, wherein the meat product is ground beef or beef patties.

12. A product as defined in claim 10, wherein the meat product is ground pork sausage patties.

13. A product as defined in claim 10, wherein the meat product is salami or pepperoni.

* * * * *